(12) United States Patent
Bauman

(10) Patent No.: US 6,920,591 B2
(45) Date of Patent: Jul. 19, 2005

(54) MEASURING AN ERROR RATE IN A COMMUNICATION LINK

(75) Inventor: Donald R. Bauman, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 132 days.

(21) Appl. No.: 10/410,066

(22) Filed: Apr. 9, 2003

(65) Prior Publication Data

US 2004/0107391 A1 Jun. 3, 2004

Related U.S. Application Data

(60) Provisional application No. 60/430,433, filed on Dec. 3, 2002.

(51) Int. Cl.[7] .................................. G06F 11/00
(52) U.S. Cl. .................. 714/704; 714/706; 714/707; 714/738
(58) Field of Search .................. 714/704, 706, 714/707, 738, 724, 736, 739, 744

(56) References Cited

U.S. PATENT DOCUMENTS

| | | | |
|---|---|---|---|
| 4,091,240 A | 5/1978 | Lainey et al. | |
| 4,428,076 A | 1/1984 | Schuon | |
| 4,710,924 A | 12/1987 | Chum | |
| 5,138,616 A | 8/1992 | Wagner, Jr. et al. | |
| 5,282,211 A * | 1/1994 | Manlick et al. | 714/707 |
| 5,455,536 A | 10/1995 | Kono et al. | |
| 5,528,635 A | 6/1996 | Negi | |
| 5,652,760 A | 7/1997 | Yamashita et al. | |
| 5,732,089 A | 3/1998 | Negi | |
| 5,761,216 A * | 6/1998 | Sotome et al. | 714/738 |
| 5,802,105 A * | 9/1998 | Tiedemann et al. | 375/225 |
| 5,937,005 A | 8/1999 | Obuchi et al. | |
| 6,175,460 B1 * | 1/2001 | Hori et al. | 360/53 |
| 6,181,730 B1 | 1/2001 | Negi | |
| 6,266,790 B1 * | 7/2001 | Nimoda | 714/704 |
| 6,295,614 B1 | 9/2001 | Peters et al. | |
| 6,310,911 B1 | 10/2001 | Burke et al. | |
| 6,349,399 B1 | 2/2002 | Manning | |
| 6,647,518 B1 * | 11/2003 | Asmanis | 714/707 |

* cited by examiner

Primary Examiner—Phung My Chung
(74) Attorney, Agent, or Firm—Fogg & Associates, LLC; David N. Fogg

(57) ABSTRACT

An error rate detector is provided. The error rate detector includes a sequence generator that is adapted to generate a test sequence for comparison with a received sequence. The error rate detector also includes a self synchronization circuit that is responsive to the test sequence received from the sequence generator and the received sequence. The self synchronization circuit is adapted to move the sequence generator to a different point in the sequence based on a measure of mismatches between the test sequence and the received sequence.

30 Claims, 5 Drawing Sheets

MEASURING AN ERROR RATE IN A COMMUNICATION LINK

CROSS REFERENCE TO RELATED APPLICATIONS

This application is related to, and claims the benefit of the filing date of, U.S. Provisional Application No. 60/430,433 filed on Dec. 3, 2002.

TECHNICAL FIELD

The present invention relates generally to the field of telecommunications, and, in particular to measuring an error rate of a communication link.

BACKGROUND

Telecommunications networks provide a mechanism for communicating between subscriber equipment at diverse locations. A typical telecommunications network includes a variety of electronic modules, circuits and components. Further, these modules are typically coupled together over various communications links or lines through switches, routers, and other conventional equipment.

Some networks transmit digital data. With systems transmitting digital data, one aspect that affects the quality of the services provided is the bit error rate. This is a measurement of the number of errors per second and is typically represented as a percentage of bad bits to good. For example, a bit error rate of 1 bit in 1 billion would be represented as a bit error rate of $10^{-9}$. A common specification for equipment manufacturers to meet is a maximum allowable bit error rate.

Before deploying equipment, manufacturers typically test their equipment in the lab to determine whether the equipment meets its design specifications. If not, modifications can be made until the criteria is met. These tests are accomplished with conventional test equipment which generates test signals, transmits the signals over the system in the lab, and then compares the output of the system with an expected signal. One aspect of this testing is that no errors are introduced by the connection between the test equipment and the system under test. This can be readily accomplished in a laboratory environment. However, once the equipment is deployed, the communication link between the system under test and the equipment under test may introduce errors into the process of measuring the error rate. For example, in the testing of a system with a host module and a remote module coupled over a fiber optic link, the test equipment cannot be connected over a perfect connection. Therefore, once deployed, the bit error rate for a system under test cannot readily be monitored to determine whether the performance level has changed since any connection back to the test equipment could also introduce errors.

Therefore, there is a need in the art for improvements in measuring and monitoring the bit error rate of a communication link.

SUMMARY

Embodiments of the present invention measure bit error rate in deployed equipment by applying a self-synchronization technique to a deterministic stream of data to maintain a substantially continuous synchronization to the stream of data even in view of errors, dropped and inserted data. In one embodiment, the data stream is a sequence of numbers and in another embodiment the data stream is a pseudorandom bit stream. For example, in one embodiment a pseudorandom bit stream with approximately 1 million bits is used.

In one embodiment, an error rate detector is provided. The error rate detector includes a sequence generator that is adapted to generate a test sequence for comparison with a received sequence. The error rate detector also includes a self synchronization circuit that is responsive to the test sequence received from the sequence generator and the received sequence. The self synchronization circuit is adapted to move the sequence generator to a different point in the sequence based on a measure of the mismatches between the test sequence and the received sequence.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention measure an error rate in a communication link of a telecommunications network. Advantageously, the embodiments measure the error rate even in deployed systems by providing a sequence generator at a first end, e.g., a host end, and a sequence detector with self-synchronization at a second end, e.g., a remote end, of the communication link. The system generates a sequence at the first end and transmits the sequence to the remote end. At the remote end, the system monitors the received sequence and compares it with a locally created test sequence. The sequence detector uses a synchronization measure to determine when synchronization is lost between the received sequence and the test sequence. When synchronization is lost, the sequence detector is seeded with a value based on recently received information to resynchronize the test sequence at the sequence detector with the sequence received from the first end.

I. System with Error Rate Monitor

Figure 1:
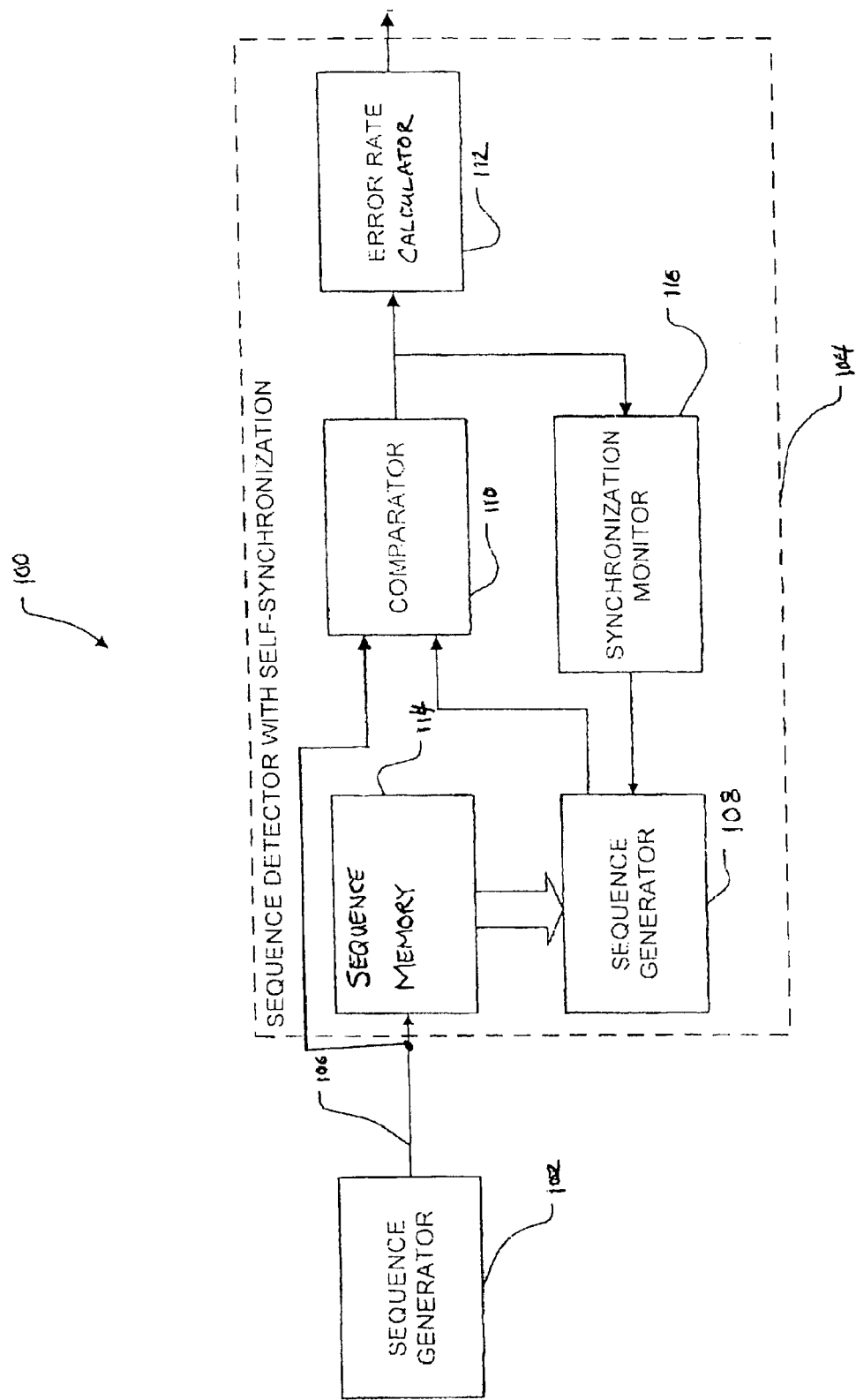
FIG. 1 is a block diagram of a system with an error rate monitoring circuit according to the teachings of the present invention.

FIG. 1 is a block diagram of a system, indicated generally at 100, with an error rate monitoring circuit according to the teachings of the present invention. System 100 includes sequence generator 102 and sequence detector 104. In one embodiment, sequence generator 102 is located at a first end of a communication link, e.g., a host terminal, and sequence detector 104 is located at a second end of the communication link, e.g., a remote terminal. Sequence generator 102 is coupled to sequence detector 104 over communication link 106.

System 100 monitors the quality of communication link 106 using sequence generator 102 and sequence detector 104 by measuring, for example, an error rate for link 106. Sequence generator 102 generates a sequence and transmits the sequence over link 106. The sequence is a deterministic sequence in that the elements or members of the sequence are determinable based on prior elements or members. In one embodiment, the sequence comprises a pseudorandom sequence of numbers. In another embodiment, the sequence comprises a pseudorandom sequence of $2^N-1$ bits. In other embodiments, any other deterministic sequence is used, e.g., consecutive numbers, etc.

In one embodiment, system 100 is a digital communication system that communicates data in digital frames over link 106. In one embodiment, the sequence is transmitted using a single bit of each frame. In other embodiments, a field or selected byte of the frame is reserved to transmit the sequence. In other embodiments, the sequence is transmitted using other portions of the frame.

Sequence detector 104 monitors a sequence received over communication link 106 and determines a measure of the error rate for the link based on comparison with a locally generated test sequence. Advantageously, sequence detector 104 self-synchronizes the test sequence with the received sequence even when members of the received sequence are lost or additional members are inserted into the received sequence. This means that system 100 is able to determine when synchronization is lost between the received and the locally generated sequences. When synchronization is lost, sequence detector 104 moves the test sequence to a different point in the sequence. In one embodiment, self-synchronization is accomplished by providing and monitoring a synchronization measure at synchronization detector 104. When this measure reaches a selected level, such as described below, synchronization detector 104 changes the expected sequence until the synchronization measure indicates synchronization has been achieved.

In one embodiment, sequence detector 104 generates a measure of the error rate for link 106. Further, sequence detector 104 also self-synchronizes to the sequence generated by sequence generator 102 such that when the sequence is corrupted in some way, sequence detector 104 detects the corruption and re-synchronizes to the received sequence. Sequence detector 104 includes sequence generator 108. Sequence generator 108 is coupled to comparator 110. Comparator 110 is also coupled to receive the sequence from sequence generator 102. Comparator 110 provides an output that indicates whether the elements of the received sequence from sequence generator 102 match the elements of the expected sequence produced by sequence generator 108. This information is provided to error rate calculator 112. In one embodiment, error rate calculator 112 determines a bit error rate for link 106. In other embodiments, error rate calculator 112 provides any other appropriate measure of the error rate.

Sequence generator 108 is self-synchronized to sequence generator 102 using a self-synchronization circuit. This self-synchronization circuit, in one embodiment, uses comparator 110, sequence memory 114 and synchronization monitor 116. Sequence memory 114 buffers a selected portion of the sequence received from sequence generator 102. For example, sequence memory 114 stores a last element of a received sequence such as a sequence of consecutive numbers. Alternatively, for a pseudorandom number sequence with $2^N-1$ bits, sequence memory 114 stores the most recent N bits. The size of sequence memory 114 is determined by how much information is necessary to be kept in order to deterministically identify the next expected element in the received sequence based on one or more previously received elements. The stored value in sequence memory 114 is used to re-seed sequence generator 108 to generate a next expected value when synchronization monitor 116 determines that synchronization has been lost.

Synchronization monitor 116 uses a synchronization measure to determine when synchronization is lost. In one embodiment, synchronization monitor 116 uses a counter to provide the synchronization measure. This counter is incremented when an element of the received sequence matches an element of the sequence generated by sequence generator 108 as indicated by comparator 110. In one embodiment, the counter is incremented on each match until a selected level is reached. When a received element of the sequence from sequence generator 102 does not match the expected element generated by sequence generator 108, the counter is decremented. In one embodiment, the counter is decremented by two on a mismatch and is incremented by 1 on a match. This is advantageous when the sequence is a bit stream since in an unsynchronized bit stream of ones and zeros a mismatch is as likely as a match. Thus, by decrementing the counter twice as fast as incrementing the counter, it is likely to march toward zero in the face of an unsynchronized bit stream.

When the counter reaches a selected level, e.g., zero, synchronization monitor 116 determines that the test sequence is not synchronized with the received sequence. Synchronization monitor 116 thus provides a reload signal to sequence generator 108. This causes data from sequence memory 114 to be loaded into sequence generator 108 to produce a next expected element for comparator 110 based on one or more recently received elements from sequence generator 102.

Figures 2A, 2B:
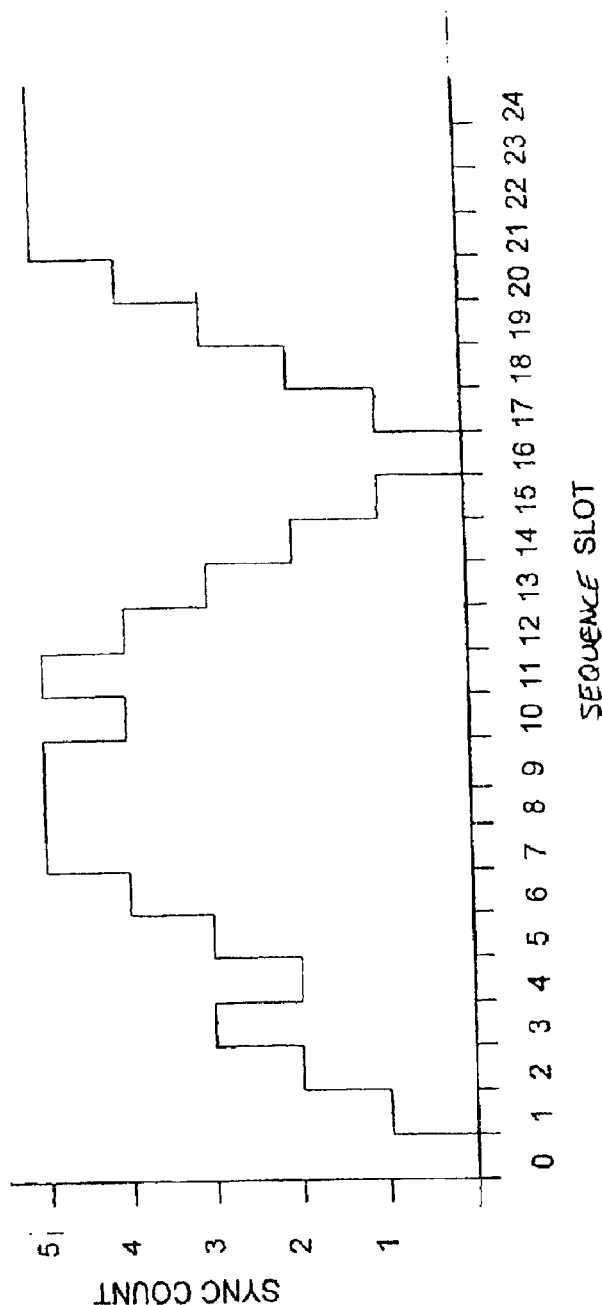
FIGS. 2A and 2B are graphs that illustrate one example of the operation of the monitoring circuit of FIG. 1.

FIGS. 2A and 2B are graphs that illustrate one example of the operation of the monitoring circuit of FIG. 1. In this example, the sequence is a sequence of consecutive numbers. In one embodiment, this sequence is implemented by counting from zero modulo 256. In this example, the members of the sequence are received in "sequence slots." In one embodiment, these slots are time slots. In other embodiments, the sequence slots are not tied to a specific time frame.

In this example, sequence detector 104 starts out with a counter value of zero indicating an out of synchronization state as shown in FIG. 2A. At sequence slot 0, the value 77 was received. Thus, synchronization monitor 116 causes this value to be provided by sequence memory 114 to sequence generator 108. Sequence generator 108 determines that the next expected value is 78 for sequence slot 1. At sequence slot 1, the element 78 is received and the counter is incremented by 1 as shown in FIG. 2A. At sequence slots 2 and 3, additional correct values are received. Thus, the counter is again incremented. In sequence slot 4, an error is detected. The value 52 is received when 81 was expected. Thus, the counter is reduced as shown in FIG. 2A. Since the counter is still greater than zero, synchronization monitor 116 does not yet initiate a re-synchronization. In sequence slots 5 through 7, additional correct values are received. Thus, the counter continues to increment toward a maximum value, for this example, of five. It is noted that in other embodiments other maximum values are used. If the maximum value for the counter is set to a high value, the error monitor has a higher immunity to noise. However, it will also take longer for the error monitor to resynchronize when the transport system slips (drops or inserts a value into the sequence).

At sequence slot 12, a slip has occurred in the sequence received from sequence generator 102. This means that one number in the sequence has been dropped in the data received over communication link 106. Since sequence generator 108 generates its sequence independent of sequence generator 102, sequence generator 108 continues to produce elements of its sequence without the slip. Thus, the expected elements and the received elements do not match in sequence slots 12 through 16. This causes the counter to be decremented with each sequence slot, as shown in FIG. 2A. When the counter reaches zero at sequence slot 16, synchronization monitor 16 causes sequence memory 114 to load sequence generator 108 with the current element, namely 94 in this example. Based on this value, sequence generator 108 moves to the point in the sequence such that the next expected value is 95 instead of 94. Thus, resynchronization is achieved and the counter increments over sequence slots 17 through 21.

II. Pseudorandom Bit Stream Embodiment

Figure 3:
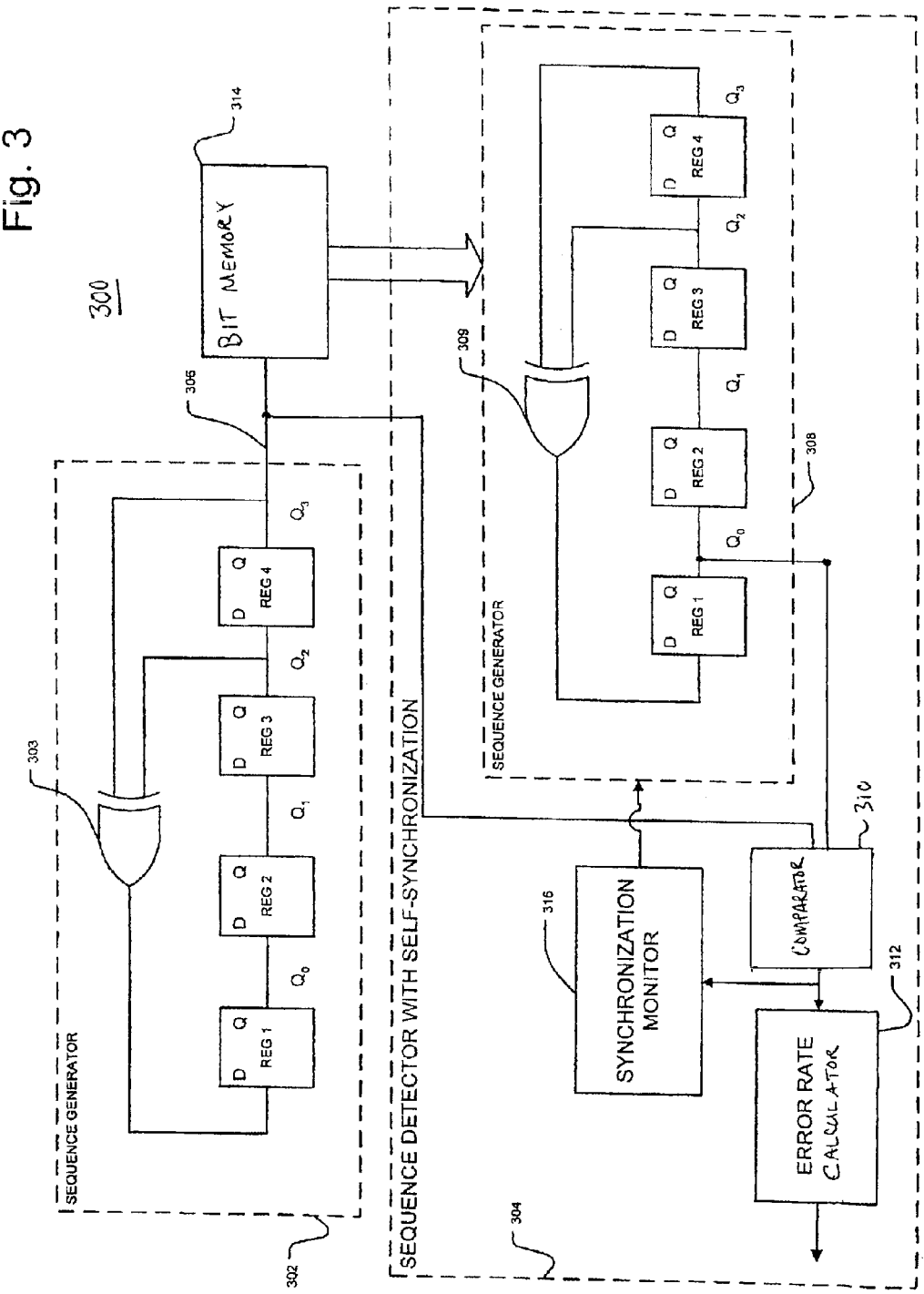
FIG. 3 is a block diagram of another embodiment of a system with a bit error rate monitoring circuit according to the teachings of the present invention.

FIG. 3 is a block diagram of another embodiment of a system, indicated at 300, with a bit error rate monitoring circuit according to the teachings of the present invention. System 300 includes sequence generator 302 and sequence detector 304. Sequence generator 302 is located at a first end of a communication link, e.g., a host terminal, and sequence detector 304 is located at a second end of the communication link, e.g., a remote terminal. Sequence generator 302 is coupled to sequence detector 304 over communication link 306.

System 300 monitors a bit error rate of communication link 306 using sequence generator 302 and sequence detector 304. Sequence generator 302 generates a sequence and transmits the sequence over link 306. The sequence is a deterministic, pseudorandom number sequence. In one embodiment, the sequence comprises a pseudorandom sequence of $2^N-1$ bits. In the example illustrated in FIG. 3, sequence generator 302 generates a 15 bit sequence taken at the output of register REG 4 ($Q_3$). In this embodiment, sequence generator 302 comprises four registers; namely REG 1, REG 2, REG 3, and REG 4. The registers are coupled together in series with the outputs of REG 3 and REG 4 being provided as feedback to REG 1 through exclusive-OR gate 303. In this configuration, sequence generator 302 produces the values set out in Table 1, below.

TABLE 1

| $Q_3$ | $Q_2$ | $Q_1$ | $Q_0$ |
|---|---|---|---|
| 1 | 1 | 1 | 1 |
| 1 | 1 | 1 | 0 |
| 1 | 1 | 0 | 0 |
| 1 | 0 | 0 | 0 |
| 0 | 0 | 0 | 1 |
| 0 | 0 | 1 | 0 |
| 0 | 1 | 0 | 0 |
| 1 | 0 | 0 | 1 |
| 0 | 0 | 1 | 1 |
| 0 | 1 | 1 | 0 |
| 1 | 1 | 0 | 1 |
| 1 | 0 | 1 | 0 |
| 0 | 1 | 0 | 1 |

TABLE 1-continued

| $Q_3$ | $Q_2$ | $Q_1$ | $Q_0$ |
|---|---|---|---|
| 1 | 0 | 1 | 1 |
| 0 | 1 | 1 | 1 |

It is noted that any of the outputs, $Q_0$ to $Q_3$ could be used as the pseudorandom number sequence. In FIG. 3, $Q_3$ is used to generate the transmitted sequence. It is also noted that any appropriate function that produces a pseudorandom number sequence of the same or different size can be used in place of the function shown in FIG. 3. This function is shown and described by way of example and not by way of limitation. In other embodiments, longer, deterministic, pseudorandom number sequences, e.g., sequences of 1 million bits or more, are used. Such deterministic sequences are generated using, for example, known or later developed algorithms.

In one embodiment, system 300 is a digital communication system that communicates data in digital frames over link 306. In one embodiment, the sequence is transmitted using a single bit of each frame. In other embodiments, a field or selected byte of the frame is reserved to transmit the sequence. In other embodiments, the sequence is transmitted using other portions of the frame.

Sequence detector 304 monitors a sequence received over communication link 306 and determines a measure of the error rate for the link based on comparison with a locally generated test sequence. Advantageously, sequence detector 304 self-synchronizes the test sequence with the received sequence even when bits of the received sequence are lost or additional bits are inserted into the received sequence. This means that system 300 is able to determine when synchronization is lost between the received and the locally generated sequences. When synchronization is lost, sequence detector 304 moves the test sequence to a different point in the sequence. In one embodiment, self-synchronization is accomplished by providing and monitoring a synchronization measure at synchronization detector 304. When this measure reaches a selected level, such as described below, synchronization detector 304 changes the expected sequence until the synchronization measure indicates synchronization has been achieved.

In one embodiment, sequence detector 304 generates a measure of the error rate for link 306. Further, sequence detector 304 also self-synchronizes to the sequence generated by sequence generator 302 such that if the sequence is corrupted in some way, sequence detector 304 detects the corruption and re-synchronizes to the received sequence. Sequence detector 304 includes sequence generator 308. Sequence generator 308 includes the same functions as sequence generator 302 and thus produces the same deterministic output when provided with the same input.

Sequence generator 308 is coupled to comparator 310. Comparator 310 is also coupled to receive the sequence from sequence generator 302. Comparator 310 provides an output that indicates whether the bits of the received sequence from sequence generator 302 match the bits of the expected sequence produced by sequence generator 308. This information is provided to error rate calculator 312. In one embodiment, error rate calculator 312 determines a bit error rate for link 306. In other embodiments, error rate calculator 312 provides any other appropriate measure of the error rate.

Sequence generator 308 is self-synchronized to sequence generator 302 by self-synchronization circuitry. This self-synchronization circuitry includes, in one embodiment, comparator 310, bit memory 314 and synchronization monitor 316. Bit memory 314 buffers a selected portion of the sequence received from sequence generator 302. For example, bit memory 314 stores the most recent N bits for a pseudorandom number sequence with $2^N-1$ bits. The size of bit memory 314 is determined by how much information is necessary to be kept in order to deterministically identify the next expected element in the received sequence based on one or more previously received elements. The stored value in bit memory 314 is used to re-seed sequence generator 308 to generate a next expected value when synchronization monitor 316 determines that synchronization has been lost.

Synchronization monitor 316 uses a synchronization measure to determine when synchronization is lost. In one embodiment, synchronization monitor 316 uses a counter to provide the synchronization measure. This counter is incremented when an element of the received sequence matches an element of the sequence generated by sequence generator 308 as indicated by comparator 310. In one embodiment, the counter is incremented on each match until a selected level is reached. When a received element of the sequence from sequence generator 302 does not match the expected element generated by sequence generator 308, the counter is decremented. In one embodiment, the counter is decremented by two on a mismatch and is incremented by 1 on a match. This is advantageous when the sequence is a bit stream since in an unsynchronized bit stream of ones and zeros a mismatch is as likely as a match. Thus, by decrementing the counter twice as fast as incrementing the counter, it is likely to march toward zero in the face of an unsynchronized bit stream.

When the counter reaches a selected level, e.g., zero, synchronization monitor 316 determines that the test sequence is not synchronized with the received sequence. Synchronization monitor thus provides a reload signal to sequence generator 308. This causes data from bit memory 314 to be loaded into sequence generator 308 to produce a next expected element for comparator 310 based on one or more recently received elements from sequence generator 302. It is noted that at sequence detector 304, the output of sequence generator 308 is taken from register REG1 ($Q_0$). This is possible since each of the outputs $Q_1$ to $Q_4$ are equivalent sequences, although delayed in time. By selecting $Q_0$ as the output value, the values from bit memory 314 can be validly loaded into the registers REG1 to REG4 of sequence generator 308 to produce the expected next value for the sequence.

III. Communication System Embodiment

Figure 4:
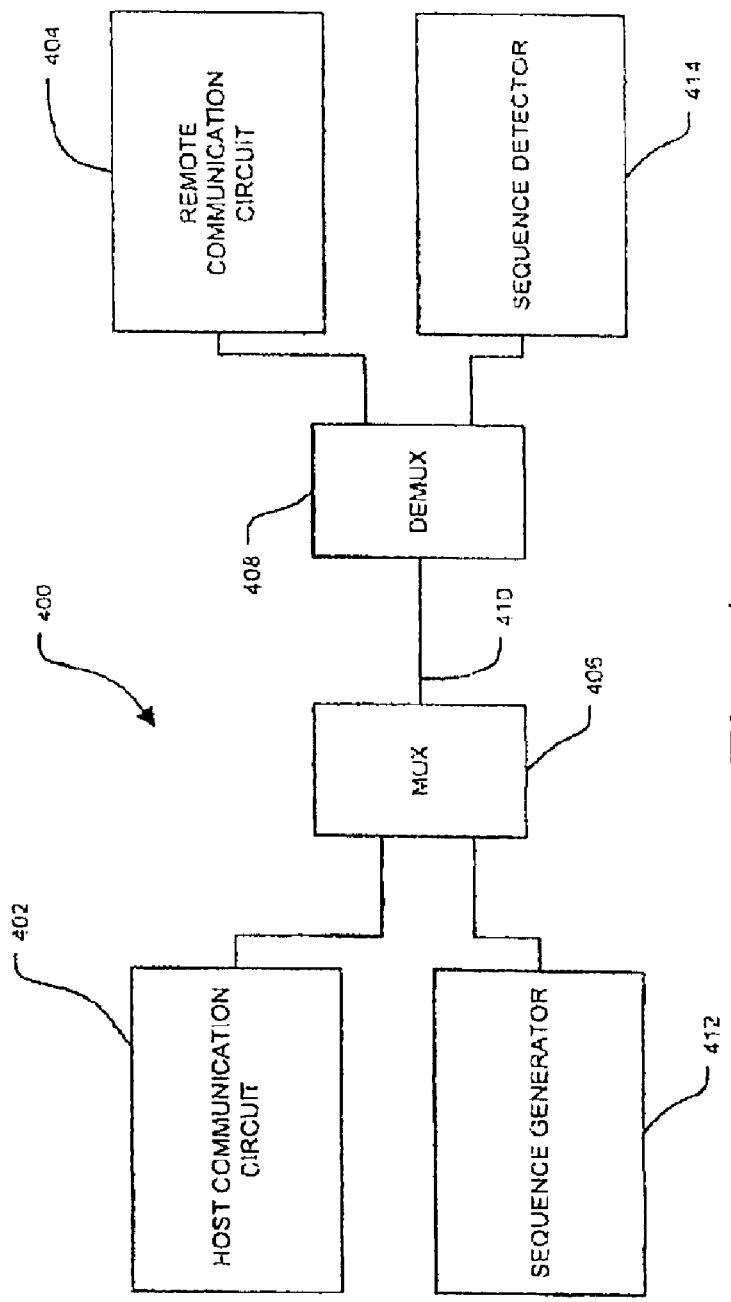
FIG. 4 is a block diagram of another embodiment of a system with an error rate monitoring circuit according to the teachings of the present invention.

FIG. 4 is a block diagram of another embodiment of a system, indicated generally at 400, with an error rate monitoring circuit according to the teachings of the present invention. System 400 includes a host communication circuit 402 and a remote communication circuit 404. It is understood that in various embodiments, communication circuits 402 and 404 are implemented as any appropriate communication circuit, e.g., communication circuits for wired, wireless, fiber optic or other communication circuits. Further, in various embodiments, communication circuits 402 and 404 are coupled together over any appropriate communication medium 410, e.g., coaxial cable, fiber optic cable, twisted pair, CAT 5, wireless, infrared, or any other appropriate communication medium.

Error rate monitoring is accomplished with sequence generator 412 and sequence detector 414. Advantageously, sequence detector 414 is self-synchronized with the sequence generated by sequence generator 412 as described above, for example, with respect any one or more of FIGS. 1–3. In this embodiment, the sequence used for determining the bit error rate is transmitted across the same communication medium 410 used to communicate traffic between the host communication circuit 402 and the remote communication circuit 404. MUX 406 inserts the sequence into the communication stream between host communication circuit 402 and remote communication circuit 404 such as by inserting bits into a selected bit position, inserting bits into a selected byte or field of a frame, or any other appropriate location in the stream of data sent between host communication circuit 402 and remote communication circuit 404. DEMUX 408 separates out the data for the received sequence and passes this to sequence detector 414.

IV. Method

Figure 5:
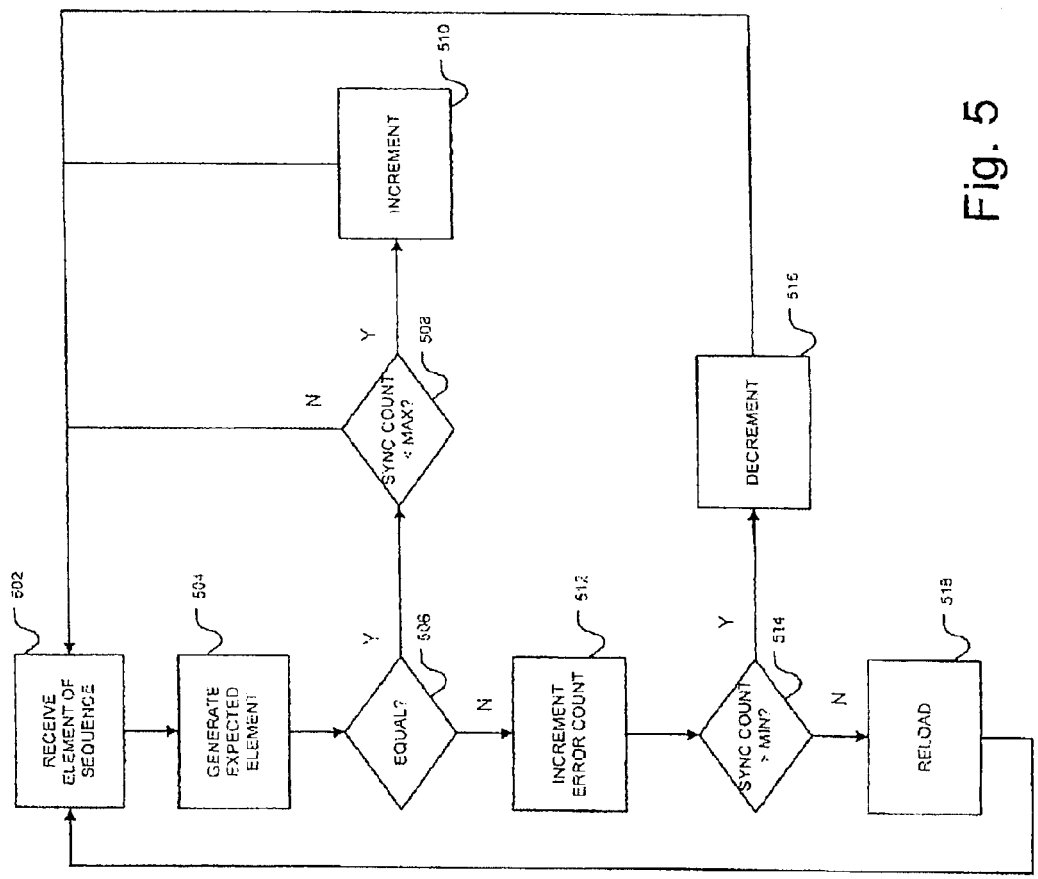
FIG. 5 is a flow chart that illustrates one method for monitoring an error rate with self-synchronization to a received sequence of data according to the teachings of the present invention.

FIG. 5 is a flow chart that illustrates one method for monitoring an error rate with self-synchronization to a received sequence of data according to the teachings of the present invention. The method begins at block 502 with receiving an element in a sequence of data used to determine the error rate. At block 504, the method determines the expected value for the received element. At block 506, the method determines whether the received element equals the expected element. If so, the method proceeds to block 508.

At block 508, the method determines whether a SYNC COUNT is less than a maximum value (MAX). If so, then the SYNC COUNT is incremented at 510 and the method returns to 502. If, however, SYNC COUNT is not less than MAX, the method returns to block 502 without incrementing SYNC COUNT. The SYNC COUNT is a measure of the synchronization of the received and generated sequences of data. If the SYNC COUNT is greater than zero, the method presumes that the two sequences are synchronized. If zero, then the method declares a loss of synchronization and action is taken to re-synchronize.

At block 506, if the two elements are not equal, the method proceeds to block 512. At block 512, the method increments an error count since the two values did not match. The method proceeds to block 514 and determines whether the SYNC COUNT is greater than a minimum value (MIN). If so, the method decrements the SYNC COUNT at block 516 and returns to block 502. If not, then the method determines that synchronization has been lost and reloads the sequence generator based on received elements at block 518 and returns to block 502.

What is claimed is:

1. An error rate detector comprising:

a memory adapted to adapted to receive a sequence transmitted over a communications link and to maintain a running history of a selected size for the received sequence;

a sequence generator adapted to generate an independent test sequence;

a comparator, responsive to the memory and the sequence generator, the comparator adapted to compare the received sequence with the test sequence;

an error rate calculator, responsive to the comparator, for generating a measure of the error rate of the communication link; and a synchronization monitor, responsive to the comparator, and adapted to provide a signal to reload the sequence generator based on the stored history in the memory when a measure of the synchronization between the received sequence and the test sequence reaches a selected level.

2. The error rate detector of claim 1, wherein the sequence generator comprises a sequence generator that generates one of a pseudorandom bit stream and a sequence of numbers.

3. The error rate detector of claim 2, wherein the memory is sized to store the last N bits of a pseudorandom bit stream $2^N-1$ bits.

4. The error rate detector of claim 2, wherein the memory is sized to store bits that represent one number in the sequence.

5. The error rate detector of claim 1, wherein the sequence generator comprises a sequence generator that generates a deterministic sequence.

6. The error rate detector of claim 5, wherein the memory stores a number of members of the sequence to allow determination of an expected next member of the sequence.

7. The error rate detector of claim 1, wherein the synchronization monitor comprises a counter that increments when a member of the received sequence matches an expected member of the test sequence and decrements the counter when the member of the received sequence does not match the expected member of the test sequence.

8. The error rate detector if claim 7, wherein the counter increments by one for each match and decrements by two for each mismatch.

9. The error rate detector of claim 1, wherein the synchronization monitor comprises a synchronization monitor that provides the signal to reload the sequence generator when the counter roaches zero.

10. An error rate monitoring system comprising:
a sequence generator that is adapted to produce a sequence and transmit the sequence over a communication link;
a sequence detector, responsive to the sequence received over the communication link, the sequence detector comprising:
a memory adapted to receive the sequence transmitted over the communications link and to maintain a running history of a selected size for the received sequence;
a second sequence generator adapted to generate an independent test sequence;
a comparator, responsive to the memory and the sequence generator, the comparator adapted to compare the received sequence with the test sequence; and
a synchronization monitor, responsive to the comparator, and adapted to provide a signal to reload the sequence generator based on the stored history in the memory when a measure of the synchronization between the received sequence and the test sequence reaches a selected level; and
an error rate calculator, responsive to the comparator of the sequence detector, for generating a measure of the error rate of the communication link.

11. The system of claim 10, wherein the second sequence generator comprises a sequence generator that generates one of a pseudorandom bit stream and a sequence of numbers.

12. The system of claim 11, wherein the memory is sized to store the last N bits of a pseudorandom bit stream of $2^N-1$ bits.

13. The system of claim 11, wherein the memory is sized to store bits that represent one number in the sequence.

14. The system of claim 10, wherein the second sequence generator comprises a sequence generator that generates a deterministic sequence.

15. The system of claim 14, wherein the memory stores a number of bits to allow determination of an expected next member of the sequence.

16. The system of claim 15, wherein the synchronization monitor comprises a synchronization monitor that provides the signal to reload the sequence generator when the counter reaches zero.

17. The system of claim 10, wherein the synchronization monitor comprises a counter that increments when a member of the received sequence matches an expected member of the test sequence and decrements the counter when the member of the received sequence does not match the expected member of the test sequence.

18. The system of claim 17, wherein the counter increments by one for each match and decrements by two for each mismatch.

19. A method for determining an error rate of a communications link, the method comprising:
receiving a deterministic sequence over the communications link;
maintaining a running history of a selected length of the received sequence in memory:
generating a test sequence;
comparing the received sequence with the test sequence;
calculating an error rate based on the comparison;
determining a synchronization measure between the received sequence and the test sequence; and
when the synchronization measure reaches a selected level, adjusting the generation of the test sequence.

20. The method of claim 19, wherein receiving a deterministic sequence of the communications link comprises receiving a pseudorandom number sequence.

21. The method of claim 19, wherein determining a synchronization-measure comprises:
incrementing a counter when a member of the rest sequence matches a member of the received sequence; and
decrementing the counter when the member of the test sequence does not match the member of the received sequence.

22. The method of claim 19, and further comprising limiting the counter to a selected maximum level.

23. The method of claim 19, wherein adjusting the generation of the test sequence comprises adjusting the generation of the test sequence when the counter reaches zero.

24. The method of claim 19, wherein adjusting the generation of the test sequence comprises generating a next expected member of the test sequence based on at least one stored member of the received sequence.

25. The method of claim 19, wherein calculating an error rate comprises calculating a bit error rate.

26. An error rate detector comprising:
a memory adapted to receive a pseudorandom sequence $2^N-1$ bits transmitted over a communications link and to maintain a running history of N bits for the received sequence;
a sequence generator adapted to independently generate a pseudorandom test sequence;
a comparator, responsive to the memory and the sequence generator, the comparator adapted to compare the received sequence with the test sequence;
an error rate calculator, responsive to the comparator, for generating a measure of the error rate of the communication link;
a synchronization monitor, responsive to the comparator, the synchronization monitor including a counter, the synchronization monitor adapted to increment the counter when a match is detected between the test sequence and the received sequence and is adapted to decrement the counter when a mismatch is detected between the test sequence and the received sequence; and wherein the synchronization monitor is adapted to provide a signal to reload the sequence generator based on the stored history in the memory when the counter reaches a selected level.

27. An error rate monitoring system comprising:

a sequence generator that is adapted to produce a sequence and transmit the sequence over a communication link; and a sequence detector, responsive to the sequence received over the communication link, the sequence detector adapted to generate a test sequence for comparison with the received sequence to determine an error rate, wherein the sequence detector further is adapted to self-synchronize the generation of the test sequence to the received sequence when a measure of the synchronization between the received sequence and the test sequence reaches a selected level, wherein the self-synchronization reseeds the sequence detector with a stored portion of the received sequence so that the test sequence resynchronizes with tho received sequence.

28. An error rate detector, comprising:

a memory adapted to receive a sequence transmitted over a communications link and to maintain a running history of a selected size for the received sequence;

a sequence generator that is adapted to generate a test sequence for comparison with the received sequence;

a self-synchronized sequence detector, responsive to the test sequence received from the sequence generator and the received sequence, that is adapted to compare the test and received sequences and to selectively move the sequence generator to a different point in the sequence based on a measure of mismatches between the test sequence and the received sequence; and an error rate calculator, responsive to the comparison between the test sequence and the received sequence, for generating a measure of the error rate.

29. A method for synchronizing a sequence generator with a remote sequence generator, the method comprising:

receiving a sequence from the remote sequence generator;

comparing a member of the received sequence with a member of a test sequence generated by the sequence generator;

incrementing a counter when the member of the test sequence matches the member of the received sequence;

decrementing the counter when the member of the test sequence does not match the member of the received sequence; and adjusting the sequence generator based on the received sequence when the counter reaches a selected level.

30. An error rate detector, comprising:

a memory adapted to receive a sequence transmitted over a communications link and to maintain a running history of a selected size for the received sequence;

a sequence generate that is adapted to generate a test sequence for comparison with the received sequence; and a self synchronization circuit, responsive to the test sequence received from the sequence generator and the received sequence, the self synchronization circuit is adapted to move the sequence generator to a different point in the sequence based on a measure of mismatches between the lest sequence and the received sequence.

* * * * *

UNITED STATES PATENT AND TRADEMARK OFFICE
CERTIFICATE OF CORRECTION

| | |
|---|---|
| PATENT NO. | : 6,920,591 B2 |
| APPLICATION NO. | : 10/410066 |
| DATED | : July 19, 2005 |
| INVENTOR(S) | : Bauman |

Page 1 of 1

It is certified that error appears in the above-identified patent and that said Letters Patent is hereby corrected as shown below:

Column 8, Line 51, please delete the second occurrence of "adapted to"

Column 9, Line 7, please insert the word --of-- after the word "stream"

Column 9, Line 30, please replace "roaches" with --reaches--

Column 10, Line 35, please replace "rest" with --test--

Column 10, Line 54, please insert the word --of-- after the word "sequence"

Column 11, Line 27, please replace "tho" with --the--

Column 12, Line 26, please replace "generate" with --generator--

Column 12, Line 34, please replace "lest" with --test--

Signed and Sealed this

Twenty-fifth Day of March, 2008

JON W. DUDAS
*Director of the United States Patent and Trademark Office*